United States Patent [19]

Gertz et al.

[11] Patent Number: 5,403,113
[45] Date of Patent: Apr. 4, 1995

[54] SHEAR LOADING ENERGY ABSORBING DEVICE

[75] Inventors: David C. Gertz, Citrus Heights; Owen S. Denman, Roseville, both of Calif.

[73] Assignee: Energy Absorption Systems, Inc., Chicago, Ill.

[21] Appl. No.: 48,151

[22] Filed: Apr. 15, 1993

Related U.S. Application Data

[63] Continuation-in-part of Ser. No. 928,980, Aug. 12, 1992, Pat. No. 5,248,129.

[51] Int. Cl.⁶ .................. B60R 19/34; B60R 19/26
[52] U.S. Cl. ........................... 404/6; 293/133; 188/374
[58] Field of Search .............. 404/6, 9, 10, 13; 256/13.1; 293/133; 188/371, 376, 377

[56] References Cited

U.S. PATENT DOCUMENTS

| | | |
|---|---|---|
| Re. 29,544 | 2/1978 | Fitch . |
| 1,828,349 | 10/1931 | Williams . |
| 2,058,283 | 10/1936 | Wolff . |
| 3,211,260 | 10/1965 | Jackson . |
| 3,307,832 | 3/1967 | Van Zelm et al. . |
| 3,308,908 | 3/1967 | Bunn ..................... 188/374 |
| 3,377,044 | 4/1968 | Jackson et al. . |
| 3,385,564 | 5/1968 | Persicke . |
| 3,672,657 | 6/1972 | Young et al. . |
| 3,944,187 | 3/1976 | Walker . |
| 4,030,706 | 6/1977 | Ward . |
| 4,047,701 | 9/1977 | Glaesener . |
| 4,255,986 | 3/1981 | Mukoyama . |
| 4,352,484 | 10/1982 | Gertz et al. . |
| 4,583,716 | 4/1986 | Stephens et al. . |
| 4,711,481 | 12/1987 | Krage et al. . |
| 4,823,923 | 4/1989 | Moyer ...................... 293/133 X |
| 4,934,661 | 6/1990 | Denman et al. . |
| 4,976,481 | 12/1990 | Yoshihira . |
| 5,022,782 | 6/1991 | Gertz et al. . |
| 5,090,755 | 2/1992 | Garnweidner ................. 293/133 |

FOREIGN PATENT DOCUMENTS

| | | |
|---|---|---|
| 0463371A3 | 5/1991 | European Pat. Off. . |
| 0507496A1 | 10/1992 | European Pat. Off. . |
| 2125990 | 9/1972 | France . |
| 2528928 | 6/1982 | France . |
| 4037101A1 | 6/1991 | Germany . |
| 607636 | 8/1960 | Italy . |
| 2082725 | 7/1980 | United Kingdom . |

OTHER PUBLICATIONS

"Dragnet" Vehicle Safety Barrier System.

Primary Examiner—Ramon S. Britts
Assistant Examiner—James A. Lisehora
Attorney, Agent, or Firm—Willian Brinks Hofer Gilson & Lione

[57] ABSTRACT

An energy absorbing device for use alongside a roadway to decelerate an impacting vehicle includes first and second elements. The first element extends in an axial direction and includes a threaded portion that defines a multitude of projecting ridges. The second element is movable relative to the first element in the axial direction, and the first and second elements are sized to create an interference fit such that relative axial movement of the second element applies a shear load to the first element to progressively deform successive ones of the projecting elements. This progressive deformation of the projecting elements retards relative axial movement between the first and second elements.

25 Claims, 3 Drawing Sheets

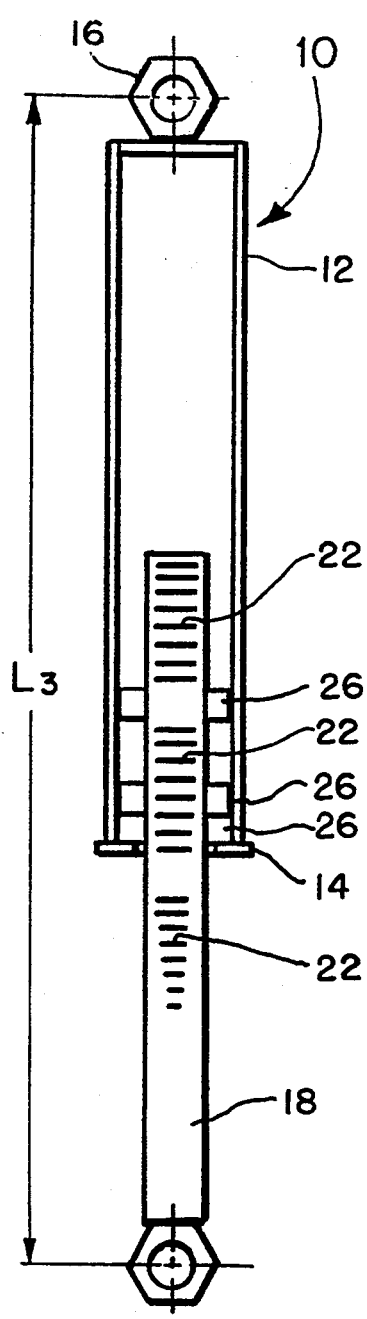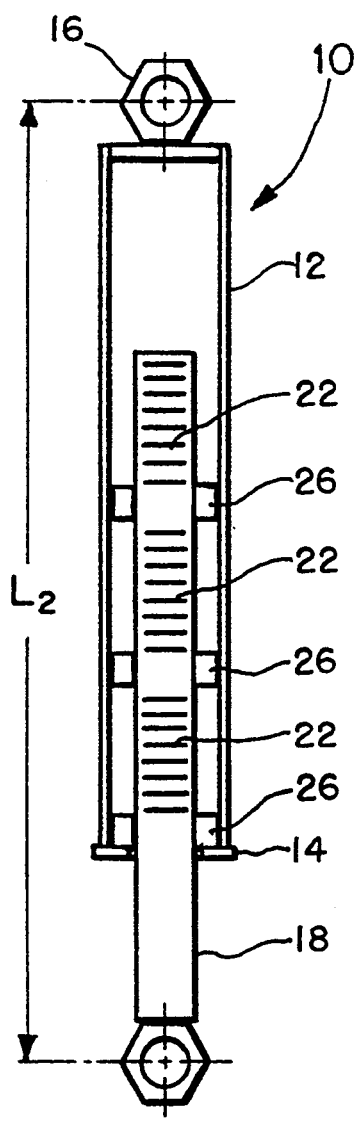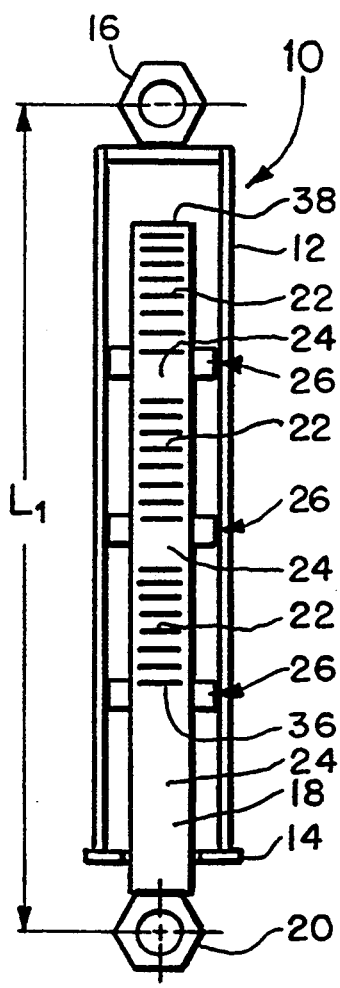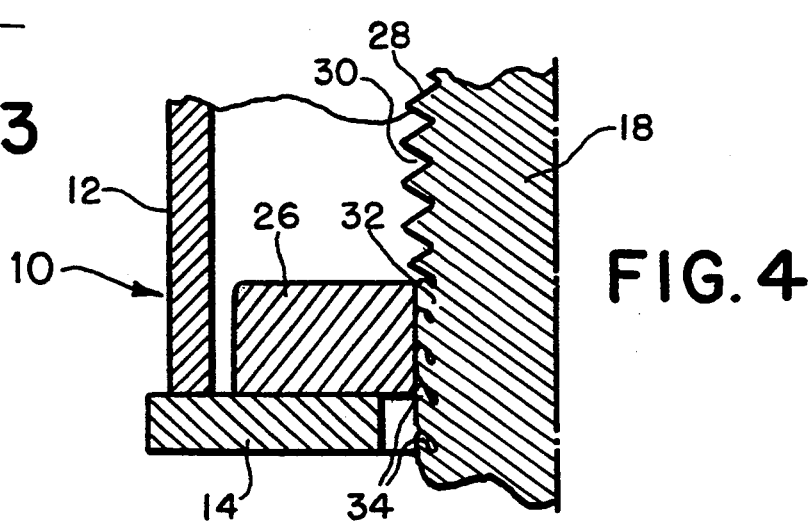

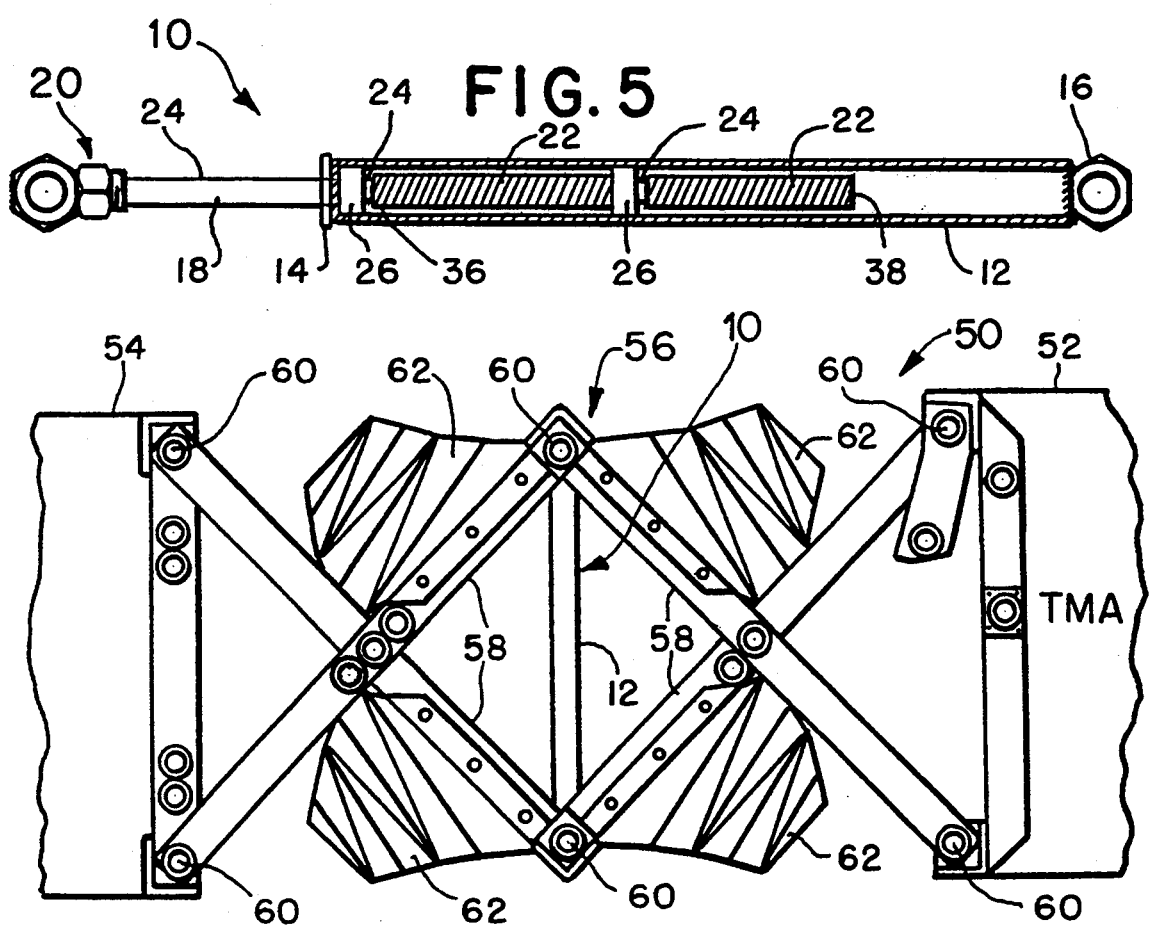
FIG. 5
FIG. 6
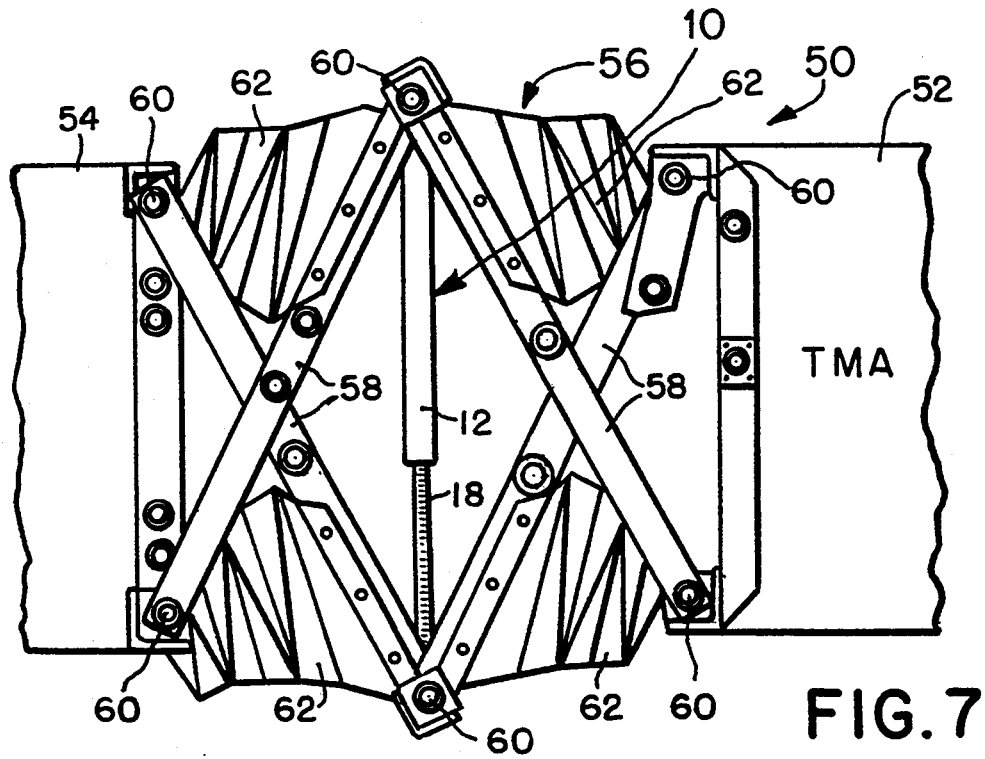
FIG. 7

SHEAR LOADING ENERGY ABSORBING DEVICE

CROSS REFERENCE TO RELATED APPLICATIONS

This application is a continuation-in-part of U.S. patent application Ser. No. 07/928,980, filed Aug. 12, 1992, now U.S. Pat. No. 5,248,129.

BACKGROUND OF THE INVENTION

This invention relates to an energy absorbing device suitable for use alongside a roadway to decelerate an impacting vehicle.

Roadside energy absorbing devices have in the past used many approaches to create a retarding force tending to slow an impacting vehicle. Inertial barriers rely on the dispersion of a mass of material such as sand, as described for example in U.S. Pat. Nos. 29,544 and 4,934,661. Other prior art systems have used containers of a liquid such as water which is forced through one or more orifices in an impact to create a retarding force (U.S. Pat. No. 3,672,657). Another approach is described in U.S. Pat. No. 4,352,484, in which a foam filled grid is forced through an adjacent foam filled grid in an impact. Other prior art devices have relied on the deformation of metallic elements by bending (U.S. Pat. Nos. 4,711,481 and 3,211,260) and on frictional forces generated between brake elements and a cable (U.S. Pat. No. 5,022,782).

In the last named of these systems, a cable is oriented along the axial direction, and an impacting vehicle forces a brake assembly to move along the cable. This brake assembly includes disc springs that press aluminum brake shoes against the cable to create a retarding force. This force is largely generated as a result of friction, though the aluminum is abraded during the process as well.

SUMMARY OF THE INVENTION

According to this invention, an energy absorbing device includes first and second elements. The first element extends in an axial direction and comprises a multitude of projecting elements distributed on a portion of the first element extending axially between first and second positions. The second element is mounted to move relative to the first element in the axial direction, and the first and second elements are sized to create an interference fit therebetween such that relative axial movement of the second element between the first and second positions applies a shear load to the first element to progressively deform successive ones of the projecting elements. This progressive deformation of the projecting elements retards relative axial movement of the first and second elements to decelerate the impacting vehicle.

BRIEF DESCRIPTION OF THE DRAWINGS

FIGS. 1, 2 and 3 are schematic longitudinal sectional views of a first preferred embodiment of the energy absorbing device of this invention at three successive stages of extension.

FIG. 4 is a schematic view in enlarged section of the embodiment of FIG. 2.

FIG. 5 is a cross-sectional view of a second preferred embodiment of this invention.

FIG. 6 is a side elevational view showing the embodiment of FIG. 5 mounted in a linkage between a truck mounted attenuator cartridge and a truck.

FIG. 7 is a side elevational view of the structure of FIG. 6 showing the linkage partially collapsed and the energy absorbing device of FIG. 5 partially extended.

DETAILED DESCRIPTION OF THE PRESENTLY PREFERRED EMBODIMENTS

Figure 8:
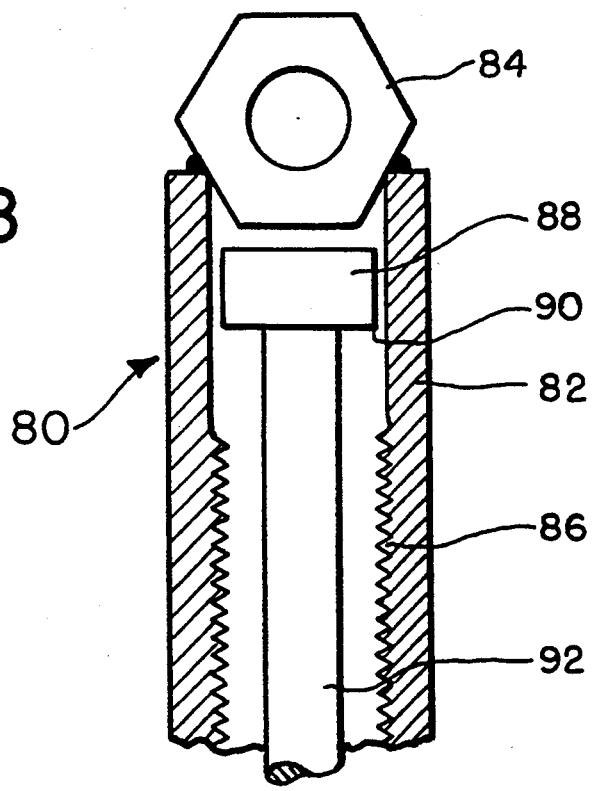
FIG. 8 is a schematic sectional view of a third preferred embodiment of this invention.

Referring to the drawings, FIGS. 1-3 show an energy absorbing device 10 which incorporates a first preferred embodiment of this invention at three stages of extension. FIG. 1 shows the device 10 in an initial position prior to use, while FIGS. 2 and 3 show the device 10 at progressively greater degrees of extension.

As shown in FIG. 1 the device 10 includes a tube 12. This tube 12 supports an annular stop 14 at one end, and an attachment 16 at the other. A rod 18 is mounted for axial movement within the tube 12, and the rod 18 passes through the stop 14. The rod 18 supports an attachment 20 at one end.

The rod 18 defines three threaded portions 22 and three reduced diameter portions 24. Three annular machining elements 26 are provided, each positioned on a respective one of the reduced diameter portions 24. As shown in FIG. 1, in the initial position all three of the machining elements 26 are spaced from the stop 14, and each of the machining elements 26 is spaced from the other machining elements 26. The machining elements 26 are dimensioned with a smaller inside diameter than the outside diameter of the threaded portions 22, such that the machining elements 26 cannot move axially along the threaded portions 22 without applying shear loads to and deforming the threaded portions 22. The degree of interference can easily be selected as desired by properly dimensioning the inside diameters of the machining elements 26 or the outside diameters of the threaded portions 22.

FIG. 1 shows the energy absorbing device 10 in an initial position, prior to use. In this position, the effective length of the energy absorbing device is equal to the length $L_1$. In use the rod 18 is moved in an axial direction relative to the tube 12 and the stop 14. FIG. 2 shows the device 10 in an intermediate position, in which the effective length of the device is equal to the length $L_2$. As the rod 18 moves from the position of FIG. 1 to the position of FIG. 2, there is substantially no resistance to extension of the rod, because none of the machining elements 26 has yet engaged the stop 14.

When the device 10 reaches the length $L_2$ (FIG. 2), the first machining element 26 comes to bear against and thereby engages the stop 14. Further extension of the rod 18 causes the threaded portion 22 adjacent the first machining element 26 to be deformed by the first machining element 26. This deformation continues as the rod 18 moves from the position of FIG. 2 to the position of FIG. 3.

Once the energy absorbing device 10 reaches an effective length of $L_3$ as shown in FIG. 3, the second machining element 26 comes to bear against the first machining element 26, and thereby indirectly engages the stop 14. Further extension of the rod 18 causes the first and second machining elements both to move along the threaded portion 22 of the rod 18. The third machining element 26 comes into contact with the second machining element 26 and thereby engages the stop 14 when the energy absorbing device 10 reaches a greater length (not shown).

FIG. 4 shows an enlarged sectional view that illustrates the operation of one of the machining elements 26. As shown in FIG. 4, the threaded portion 22 of the rod 18 defines an array of alternating ridges 28 and depressed areas or grooves 30. Even though the ridges 28 are all interconnected to form a spiral thread, the ridges 28 effectively form a multitude of projecting elements. The machining element 26 defines a machining surface 32 that is positioned to interfere with the ridges 28. Relative axial movement of the rod 18 with respect to the machining element 26 causes the machining surface 32 to apply a shear load which deforms the ridges 28 by cutting, tearing and bending the tops of the ridges 28.

The deformed ridge material 34 is moved into the adjacent grooves 30. In this connection, the grooves 30 define a receiving volume which is sufficiently large to receive substantially all of the deformed ridge material 34. This prevents the deformed ridge material 34 from building up in front of the machining surface 32, and thereby promotes the creation of reproducible and controllable retarding forces. When the tops of the ridges 28 have the same size and shape as the bottoms of the grooves 30, it is preferred that the interference between the machining surface 32 and the ridges 28 be less than one-half the height of the ridges 28.

Returning to FIGS. 1 and 3, it can be seen that in use, the rod 18 moves through an axial stroke with respect to the tube 12, the stop 14 and the machining elements 26. Between lengths $L_1$ and $L_2$ there is substantially no resistance to rod extension, and this portion of the stroke can be referred to as a free stroke. As the device 10 is extended beyond the length $L_2$ to a final length greater than the length $L_2$, the rod moves through a retarding stroke in which relative movement between the rod 14 and the machining elements 26 deforms the ridges 28 and thereby creates a retarding force. In this embodiment, the ridges of the threaded portion 22 extend between first and the second points 36, 38. These first and second points 36, 38 can be selected as desired. In use, the actual stroke of the energy absorbing device 10 will depend in part on the energy of impact of an impacting vehicle, and for this reason a varying fraction of the ridges will be deformed in any given event.

FIG. 5 shows a longitudinal sectional view of a commercial embodiment of the energy absorbing device 10. The same reference numerals have been used in this embodiment as in the embodiments of FIGS. 1-3. In the embodiment of FIG. 5, the stop 14 is welded in place on the tube 12. The attachment 16 takes the form of a nut welded in place to the tube 12, and the attachment 20 takes the form of two nuts welded together and threaded to one end of the rod 18. Preferably this threaded connection is immobilized in some manner, as for example with a suitable thread locking compound.

In the embodiment of FIG. 5, the threaded portions 22 of the rod 18 are one inch in outside diameter and the ridges 28 and grooves 30 are formed as 8 UNC threads. The reduced diameter portions 24 in this embodiment have a diameter of 0.855 inch, and the overall length of the rod 18 is about 21½ inches. The rod 18 can be formed by turning a Grade B7 threaded rod to remove the threads in the reduced diameter portions. By way of example, in this embodiment the machining elements or dies 26 are solid, rigid, annular rings which are threaded to facilitate installation on the rod 18. These rings define an inside diameter of 0.955 inch and an outside diameter of 1.450 inch, and are preferably formed by turning a grade DH nut (1) to remove part of the threads to achieve the desired inside diameter and (2) to remove the hexagonal wrench flats. A grade DH nut is preferred because it is harder than the rod 18. When conventionally threaded elements are used, it is generally important to reduce the interference between the two parts in order to ensure that the threads fail in shear before the threaded elements fail in tension.

In the embodiment of FIG. 5, the inner diameters of the two machining elements 26 are identical, and the outer diameter of the threaded portions 22 is constant. With this arrangement, the retarding force generated by relative movement between the rod 18 and the machining elements 26 amounts to about 12,000 lbs. force. During the retarding stroke, the machining surfaces of the machining elements 26 are worn to some extent. By using two separate machining elements 26 having the same inside diameter, wear of this type is compensated, and any substantial reduction in the retarding force is avoided. If desired, the inside diameter of the second machining element 26 can be made smaller than that of the first in order to increase the retarding force midway through the stroke. Of course, it should be understood that the preferred dimensions, materials, and characteristics described above in connection with FIG. 5 are intended only to define one commercial embodiment. These details of construction in no way limit the invention.

Energy absorbing devices of the type described above can be used in a wide variety of settings to decelerate an impacting vehicle along a roadway. FIGS. 6 and 7 show one preferred embodiment of a mounting arrangement 50 which includes a forward portion 52 such as a truck mounted attenuator cartridge and a reaction portion 54 such as a truck to which the truck mounted attenuator ("TMA") cartridge is mounted. The mounting arrangement 50 includes a scissors linkage 56 made up of two pairs of crossing links 58 which pivot about pivot axes 60. The links 58 support sheet metal deformable elements 62. The mounting arrangement 50 of FIGS. 6 and 7 is described in complete detail in co-pending U.S. patent application Ser. No. 07/928,980, which is hereby incorporated by reference in its entirety.

FIG. 6 shows the mounting arrangement 50 in its initial state. The energy absorbing device 10 is mounted between the central pivot axes 60, and has an initial, unextended length as shown in FIG. 5.

When the TMA cartridge is struck by an impacting vehicle, the vehicle collapses the scissors linkage 56. FIG. 7 shows the linkage 56 at an intermediate stage of collapse, in which the intermediate pivot axes 60 have moved substantially away from one another. This action extends the energy absorbing device 10, and forces the machining elements 26 to move along the rod 18 and to deform the ridges 28. Retarding forces generated by the energy absorbing device 10 oppose outward movement of the intermediate pivot axes 60, and thereby apply a retarding force on the impacting vehicle. Further collapse of the linkage 56 causes the deformable elements 62 to be crushed against the ends of the linkage 56, as described in complete detail in the above referenced U.S. patent application Ser. No. 07/928,980. Preferably, two of the energy absorbing devices 10 are used with the scissors linkage 56, each positioned adjacent to a respective side of the linkage 56. Also, the deformable elements 62 are preferably made of 12 gauge steel in this example.

The invention is not limited to the specific embodiments described above, and many alternatives and variations are possible. For example, FIG. 8 shows a third preferred embodiment of an energy absorbing device 80 which includes a tube 82 which supports at one end an attachment 84. In this case, the interior of the tube 82 defines an array of threads 86, and a machining element 88 is positioned within the tube 82. This machining element 88 defines a machining surface 90 that is dimensioned to interfere with the threads 86. A rod 92 is secured to the machining element 88 and extends axially out the open end (not shown) of the tube 82. When the rod 92 is extended out of the tube 82, the machining element 88 deforms the threads 86 in the manner described above to create a retarding force.

Figure 9:
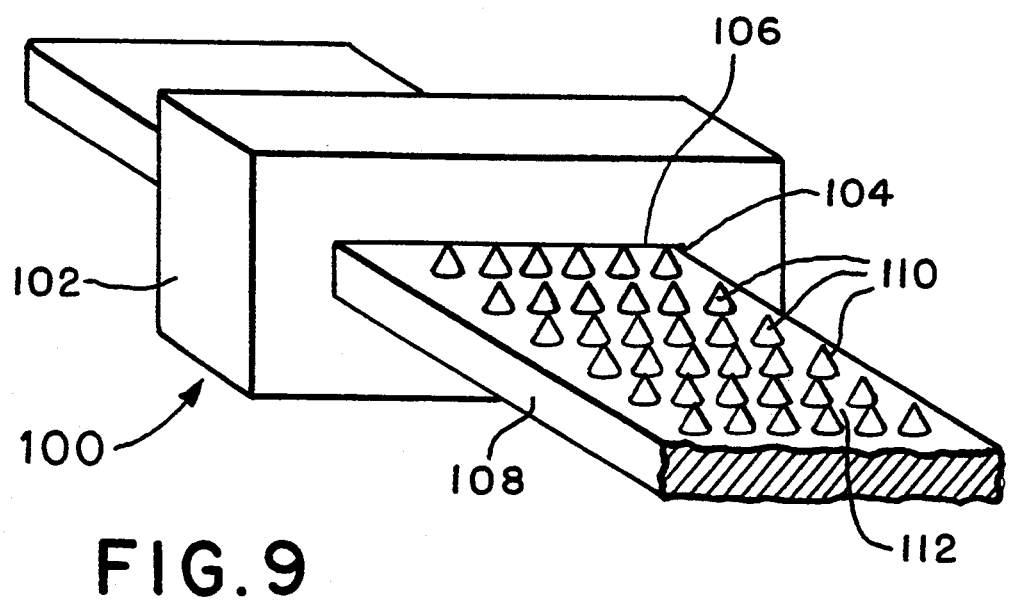
FIG. 9 is a schematic perspective view of a fourth embodiment of this invention.

FIG. 9 shows a fourth embodiment of this invention which comprises an energy absorbing device 100. In this case, the machining element 102 is annular, and it defines a rectangular opening 104. The margins of this opening define a machining surface 106. A rod 108 extends through the opening 104, and in this embodiment the rod 108 is rectangular in cross-section and shaped as a plate or strap. In this case, one or more surfaces of the rod 108 define projecting elements 110 separated by depressed areas 112, and the projecting elements 110 are shaped as discrete peaks rather than ridges. Movement of the rod 108 through the opening 104 causes the machining surface 106 to deform the projecting elements 110 and to create a retarding force in the manner described above.

As pointed out above, the projecting elements can be shaped as discrete projecting elements, parallel ridges or threads, and they can be cut, stamped, deposited, or machined in place. The machining element can be placed inside the deformable projecting elements or the reverse. The device can be designed either for use in extension, as described above, or in compression. When multiple machining elements are used the dimensions of the machining surfaces can be constant, or they can increase or decrease from one machining element to another. In the preferred embodiments described above, either the machining element or the projection defining element is annular in shape, though the opening can be either round, rectangular or any other desired cross-sectional shape. The height, density, and thickness of the projecting elements can be varied to adjust or modulate the retarding force during the stroke.

In the embodiment of FIGS. 1-5, the machining elements 26 are initially spaced from the stop 14 to create the free stroke described above. This arrangement operates as a means for preventing initial movement of the rod 18 from deforming the threaded portions 22. The same result can be achieved by fixedly mounting the machining elements in place on the tube 12 and properly dimensioning the reduced diameter portions 24.

In the example set out above, the energy absorbing device 10 is used in a scissors linkage on a mounting arrangement for a truck mounted attenuator. This invention is not limited to this application, and it can readily be adapted to other energy absorbing mounting arrangements alongside a roadway. For example, the energy absorbing device 10 can be used in a collapsible system of the type shown in U.S. Pat. Nos. 3,944,187 and 4,583,716, in which parallel diaphragms are arranged to move together in an impact. Similarly, the energy absorbing device 10 can be adapted for use in a system of the type shown in U.S. Pat. No. 5,022,782. For example, the threaded rod 18 can be elongated and substituted for the cable, and the machining element 26 can be used in place of the brake arrangement of that patent.

From the foregoing, it should be apparent that an energy absorbing device has been described which is well suited to generate a retarding force that is predictable, repeatable and well-controlled. The retarding force profile can be controlled as desired to remain constant, increase or decrease over the retarding stroke. This device also allows the free stroke length to be adjusted easily as appropriate for the particular application. The device is simple and reliable, and it does not rely on frictional characteristics to generate the retarding force. The need for spring clamps has been eliminated, and the device can easily be adapted to a wide range of applications.

It is intended that the foregoing detailed description be regarded as illustrative rather than limiting, and that it be understood that it is the following claims, including all equivalents, which are intended to define the scope of this invention.

We claim:

1. An energy absorbing device for use alongside a roadway to decelerate an impacting vehicle, said device comprising:

first and second elements, each comprising a respective attachment;

said first element extending in an axial direction and comprising a multitude of projecting elements distributed successively along the axial direction on a portion of the first element extending axially between first and second positions;

said second element mounted to move relative to the first element in the axial direction, said first and second elements sized to create an interference fit such that relative axial movement of the second element between the first and second positions applies a shear load to the first element to progressively deform successive ones of the projecting elements, said progressive deformation of the projecting elements retarding said relative axial movement, said interference fit, prior to said progressive deformation, positioned between the attachment of the first element and at least a portion of the projecting elements;

a mounting arrangement comprising:

a forward portion configured to engage the impacting vehicle;

a reaction portion configured to resist the impacting vehicle; and a linkage coupling the first and second elements to the forward portion and the reaction portion such that when the impacting vehicle moves the forward portion toward the reaction portion, the linkage causes the attachments of the first and second elements to move away from one another.

2. The invention of claim 1 wherein the projecting elements comprise an alternating array of ridges and grooves.

3. The invention of claim 1 wherein one of the first and second elements defines an opening in which the other of the first and second elements is received.

4. The invention of claim 3 wherein said one of the first and second elements is continuous around the opening and the opening defines a predetermined cross-sectional dimension.

5. The invention of claim 1 wherein the first and second positions define a retarding stroke extending therebetween, and wherein the second element progressively deforms successive ones of the projecting elements throughout the retarding stroke as the second element moves between the first and second positions.

6. The invention of claim 1 wherein the projecting elements are separated by depressed regions on the first element, and wherein the depressed regions define a receiving volume large enough to receive deformed portions of the projecting elements during relative axial movement of the second element between the first and second positions.

7. The invention of claim 1 further comprising:
a mounting arrangement comprising:
a forward portion configured to engage the impacting vehicle;
a reaction portion configured to resist the impacting vehicle; and
a linkage coupling the first and second elements to the forward portion and the reaction portion such that when the impacting vehicle moves the forward portion, the linkage causes relative axial movement between the first and second elements.

8. The invention of claim 1 wherein the second element comprises a machining element sized to create said interference fit, wherein one of the first and second elements comprises a stop initially spaced axially from the machining element to engage the machining element after an initial travel distance to cause the machining element to begin to deform the projecting elements.

9. The invention of claim 1 further comprising means for preventing the second element from deforming the projecting elements during an initial free stroke of relative movement between the first and second elements.

10. An energy absorbing device for use alongside a roadway to decelerate an impacting vehicle, said device comprising:
first and second elements;
said first element extending in an axial direction and comprising a multitude of projecting elements distributed on a portion of the first element extending axially between first and second positions;
said second element mounted to move relative to the first element in the axial direction, said first and second elements sized to create an interference fit such that relative axial movement of the second element between the first and second positions applies a shear load to the first element to progressively deform successive ones of the projecting elements, said progressive deformation of the projecting elements retarding said relative axial movement;
at least one additional element axially spaced from the second element prior to impact, said additional element mounted to move relative to the first element in the axial direction, said first and additional elements sized to create an interference fit such that relative axial movement of the additional element applies a shear load to the first element to progressively deform successive ones of the projecting elements, said progressive deformation of the projecting elements retarding said relative axial movement.

11. The invention of claim 10 wherein the second and additional elements each create a respective interference fit with the first element, and wherein the interference fits differ in degree.

12. An energy absorbing device for use alongside a roadway to decelerate an impacting vehicle, said device comprising:
an annular element that defines an opening extending therethrough;
a rod that extends through the opening;
a mounting arrangement comprising a forward portion configured to engage the impacting vehicle and a reaction portion configured to resist the impacting vehicle, said rod and annular element coupled to the forward and the reaction portions such that in an impact the impacting vehicle moves the rod relative to the annular element through an axial stroke;
a machining surface coupled to one of said rod and annular element;
a set of projecting elements coupled to the other of the rod and the annular element and positioned between first and second positions along the stroke to interfere with the machining surface such that the machining surface applies a shear load to and successively deforms individual ones of the protruding elements during relative movement of the rod and the annular element through the stroke;
wherein the machining surface is harder than the projecting elements;
a scissors linkage comprising a forward portion configured to engage the impacting vehicle and a reaction portion configured to resist the impacting vehicle, said rod and annular element coupled to the forward and reaction portions such that in an impact the scissors linkage pulls the rod through the stroke relative to the annular element as the scissors linkage collapses.

13. The invention of claim 12 wherein the projecting elements comprise an array of alternating ridges and grooves.

14. The invention of claim 12 wherein the annular element is continuous around the opening and the opening defines a predetermined cross-sectional dimension.

15. The invention of claim 12 wherein the projecting elements are separated by depressed regions, and wherein the depressed regions define a receiving volume large enough to receive deformed portions of the projecting elements during relative movement of the rod and the annular element through the stroke.

16. The invention of claim 12 wherein said one of the rod and annular element that comprises a machining surface further comprises a stop initially spaced axially from the machining surface to prevent the machining surface from deforming the protruding elements during an initial portion of the stroke.

17. An energy absorbing device for use alongside a roadway to decelerate an impacting vehicle, said device comprising:
an annular element that defines an opening extending therethrough;.
a rod that extends through the opening;
a mounting arrangement comprising a forward portion configured to engage the impacting vehicle and a reaction portion configured to resist the impacting vehicle, said rod and annular element coupled to the forward and the reaction portions such that in an impact the impacting vehicle moves the rod relative to the annular element through an axial stroke;

a machining surface coupled to one of said rod and annular element;

a set of projecting elements coupled to the other of said rod and annular element and positioned between first and second positions along the stroke to interfere with the machining surface such that the machining surface applies a shear load and successively deforms individual ones of the protruding elements during relative movement of the rod and the annular element through the stroke;

an additional element that defines an additional machining surface shaped to deform the projecting elements, said additional element axially spaced from the first mentioned machining surface along the stroke prior to impact.

18. The invention of claim 17 wherein the additional machining surface provides an interference fit with the projecting elements with a greater degree of interference than does the first mentioned machining surface.

19. An energy absorbing device for use alongside a roadway to decelerate an impacting vehicle, said device comprising:

an annular element that defines an opening extending therethrough;

a rod that extends through the opening;

a mounting arrangement comprising a forward portion configured to engage the impacting vehicle and a reaction portion configured to resist the impacting vehicle, said rod and annular element coupled to the forward and the reaction portions such that in an impact the impacting vehicle moves the rod relative to the annular element through an axial stroke;

a machining surface coupled to one of said rod and annular element;

a set of projecting elements coupled to the other of said rod and annular element and positioned between first and second positions along the stroke to interfere with the machining surface such that the machining surface applies a shear load to and successively deforms individual ones of the protruding elements during relative movement of the rod and the annular element through the stroke;

wherein said one of the rod and annular element that is coupled to the machining surface further comprises a stop initially spaced axially from the machining surface to prevent the machining surface from deforming the protruding elements during an initial portion of the stroke.

20. An energy absorbing device for use alongside a roadway to decelerate an impacting vehicle, said device comprising:

an annular element comprising a stop;

a rod positioned partly within the annular element extending adjacent the annular stop, said rod comprising an alternating array of ridges and grooves;

a mounting arrangement comprising a forward portion configured to engage the impacting vehicle and a reaction portion configured to resist the impacting vehicle, said rod and annular element coupled to the forward and reaction portions such that in an impact the impacting vehicle moves the rod relative to the annular element through an axial stroke;

a plurality of machining elements positioned along the rod, each machining element spaced from the stop by a respective length when in an initial position prior to impact;

said machining elements each being contactable with said rod and each being dimensioned to apply shear loads to the ridges on said rod to deform the ridges when the machining elements move axially along the rod;

a high energy impact moving the rod and the machining elements relative to the annular element until the machining elements successively engage the stop, whereupon the machining elements are forced along the rod, thereby deforming the ridges and creating a retarding force.

21. The invention of claim 20 wherein the machining elements each define a respective inside diameter, and wherein the inside diameters differ from one another.

22. The invention of claim 20 wherein each of the machining elements is continuous around the rod and defines a predetermined cross-sectional dimension.

23. The invention of claim 20 wherein the machining elements are harder than the ridges.

24. The invention of claim 20 wherein the grooves are large enough to receive deformed portions of the ridges during relative movement of the rod and the machining elements.

25. The invention of claim 20 wherein the mounting arrangement comprises a plurality of links interconnected at pivot axes to form a scissors linkage, and wherein the annular element and the rod are mounted to respective portions of the scissors linkage such that the scissors linkage pulls the rod through the axial stroke relative to the annular element as the scissors linkage collapses.

* * * * *